Figure 1:
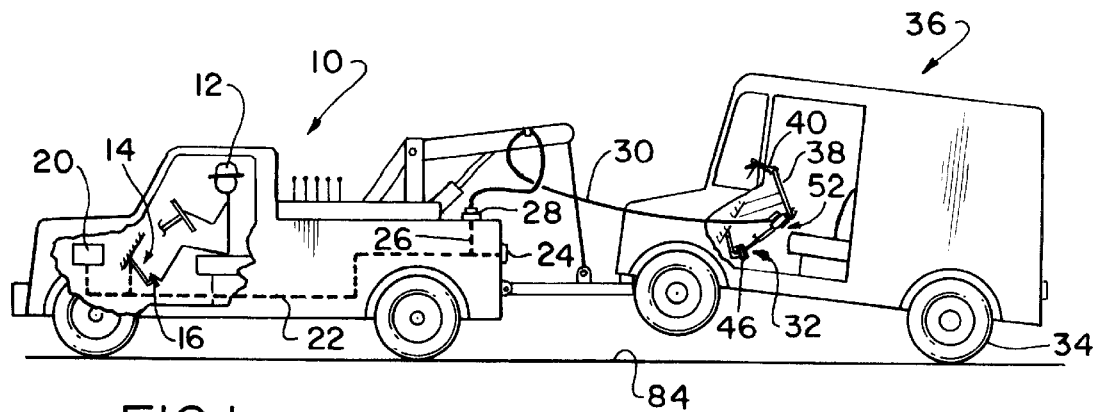

United States Patent
Granata

[19]

[11] Patent Number: 6,095,619
[45] Date of Patent: Aug. 1, 2000

[54] BRAKING SYSTEM FOR A TOWED VEHICLE

[76] Inventor: Ralph Granata, 994 E. 93rd St., Brooklyn, N.Y. 11236

[21] Appl. No.: 09/165,554
[22] Filed: Oct. 2, 1998
[51] Int. Cl.[7] .................................................. B60T 13/00
[52] U.S. Cl. .............................................. 303/7; 188/112 R
[58] Field of Search ........................... 303/7; 188/112 R, 188/3 R; 280/432

[56] References Cited

U.S. PATENT DOCUMENTS

| | | | |
|---|---|---|---|
| 5,031,729 | 7/1991 | Wittkop et al. | 188/112 R |
| 5,411,321 | 5/1995 | Harness | 303/7 |
| 5,465,813 | 11/1995 | Lichter | 303/7 |

*Primary Examiner*—Christopher P. Schwartz
*Assistant Examiner*—Mariano Sy
*Attorney, Agent, or Firm*—Myron Amer P.C.

[57] ABSTRACT

In the tandem operation of two vehicles, one towing and the other being towed, an accommodation is readily made for a wide range of different models of the towed vehicle using, in spanning relation between the towed vehicle's steering wheel and brake pedal, a lengthwise extensible brake pedal-depressing component, wherein simultaneous with the braking of the towing vehicle, is when the component extends to brake the towed vehicle to contribute to a safer, coordinated stopping of the two vehicles.

1 Claim, 1 Drawing Sheet

BRAKING SYSTEM FOR A TOWED VEHICLE

The present invention relates generally to improvements in the tandem operation of two vehicles, one which is towing and the other being towed, wherein the improvements make readily available an operational mode in which the braking systems are operated simultaneously irrespective of the different models and makes of the vehicles which unavoidably introduces corresponding structural and operation differences in the braking systems of the respective vehicles.

EXAMPLE OF THE PRIOR ART

It is already well known that simultaneous or almost simultaneous to the braking of a towing vehicle, that the braking system of a towed vehicle should be operated so as to contribute to a coordinated and safer stopping of the rear wheels of the towed vehicle in contact with the riding surface. Thus, as described and illustrated in U.S. Pat. No. 5,465,813 for Brake Unit issued to Lichter on Nov. 4, 1995, the pressure air of an air brake-operated towing vehicle is diverted to operate the air brake of a towed vehicle. Both vehicles as noted however, must be air brake-operated to achieve the purpose intended, and thus the benefit of a safer operation of the vehicles is not available in a simple and effective manner to many other makes and models of towing and towed vehicles.

Broadly, it is an object of the present invention to provide what aptly can be characterized as "universal" operational relation between braking systems of towing/towed vehicles, thereby overcoming the foregoing and other shortcomings of the prior art.

More particularly, it is an object to implement by mechanical means the simultaneous or nearly simultaneous operation of the vehicles' braking systems, by using to advantage the facilitation that a mechanical means provides to make ready adjustments to accommodate structural and operation differences in the respective braking systems of the vehicles, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 2:
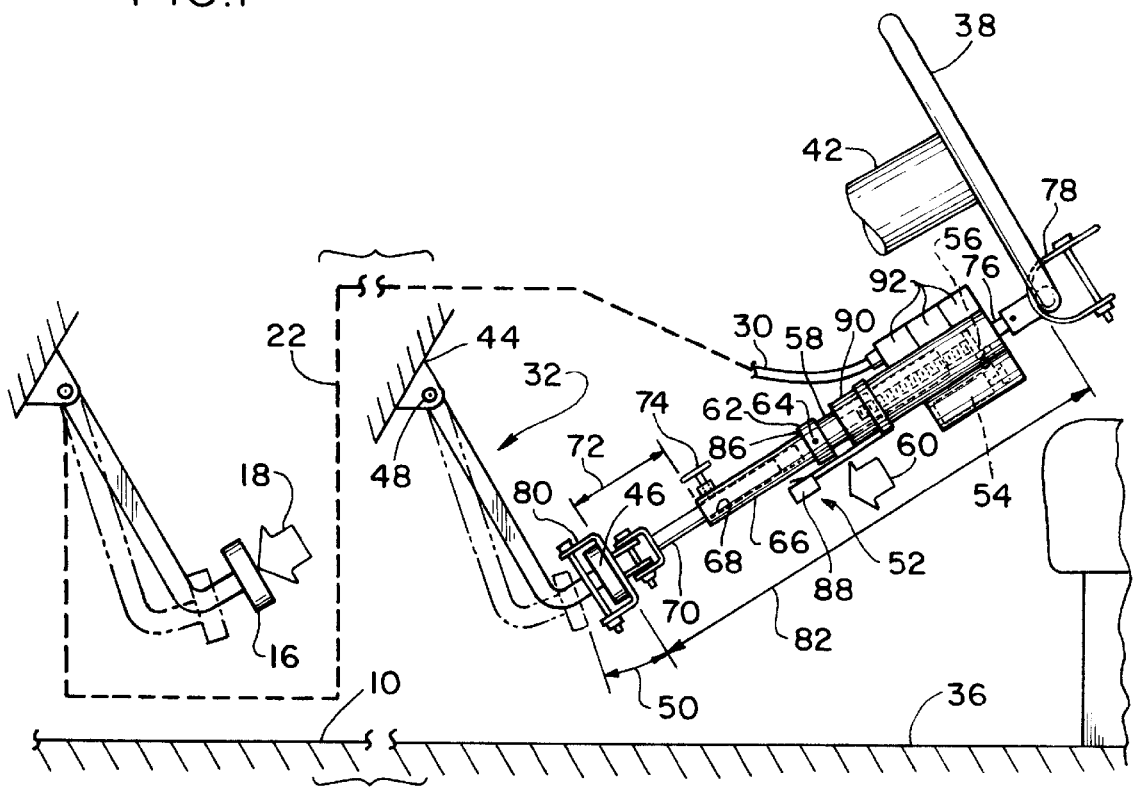

FIG. 1 is a side elevational view of a towing vehicle and a towed vehicle in which, according to the present invention, braking operation of the former causes simultaneous braking operation of the latter; and FIG. 2 is an isolated simplified side elevational view of details of the within inventive cooperating vehicle braking systems.

Shown in FIG. 1 is a towing vehicle, generally designated 10, the invention-pertinent operating mode of which is under the control of a driver 12 and includes a braking system 14 with a foot-activated pivotally traversable brake pedal 16 movable from a non-braking position as indicated by arrow 18 and illustrated in full line perspective to a brake-applying position, as noted in phantom line perspective. During operation of the towing vehicle braking system 14, a battery 20 is electrically connected via connecting wires 22 to illuminate brake lights 24, and this operating circumstance is used to advantage to provide electrical current via a tap-off 26 to a plug 28 connected via an insulated cable 30 to a towed vehicle braking system, generally designated 32, all to the end of placing the braking system 32 in a braking mode which, as should be readily understood, terminates rotation of the rear wheels 34 of the towed vehicle 36 to facilitate a smooth, coordinated and simultaneous braking of the vehicles 10 and 36, all as will now be described in detail in connection with FIG. 2.

The towed vehicle 36 has a steering wheel 38 supported on a steering wheel column 42, and, typically held by a cord 40 or the like against inadvertent rotation for reasons of safety and to provide proper straight-ahead tracking, and on a floor board location, as at 44, below and angularly forward of the steering wheel 38 the noted towed vehicle braking system 32 is pivotal at 46 so as to partake of a pivotal traverse 48 from full line to phantom line illustrated positions of movement, in which the phantom line position causes in a well understood manner the prior noted braking of the rear wheels 34.

The actual braking operation is achieved using an elongated assemblage, generally designated 50, of a commercially available electric motor-operated length-increasing means sold under the designation Electrak actuators by Warner Electric of South Biloit, Ill., which includes an electric motor 52 in driving relation to a lead screw gear train 54 mechanically connected to a ram 56 attached, in a well understood manner, to be urged in lengthwise movement 58 in response to the rotation of the lead screw of the gear train 54. A collar 62 and pin 64 connects a first length-adjusting means, preferably a sleeve 66, with an internal bore 68 in longitudinally extending relation from the ram 56 in the direction 60 of the brake pedal 46, and slidably disposed in the bore 68 is a second cooperating length-adjusting means, preferably a rod 70. In use, rod 70 is withdrawn lengthwise of the sleeve 66 to establish a selected length 72, and this established length 72 is maintained with a lock or set screw 74.

Completing the opposite ends of the assemblage 50 are, at the top, a stud 76 mounting a steering wheel-engaging clamp 78, and at the bottom, a pedal-engaging clamp 80. It is important to note, and as should be readily understood from the description provided, that the dimension 82 between the steering wheel 38 and full line position of the brake pedal 46 is a required dimension for wedging the assemblage 50 in spanning relation between the steering wheel 38 and brake pedal 46. Underlying the present invention is the recognition that the required wedge dimension 82 will vary depending on the model and make of the towed vehicle 36 and that this variable is of no adverse consequence since the established length 72 is selected to account for any such variation, i.e., to provide a length in the assemblage 50 which is substantially equal to a properly required wedge dimension 82.

With the assemblage or device 50 wedged in place between the steering wheel 38 and brake pedal 46, operation of the braking system 14 of the towing vehicle 10 causes, as already noted, operation of electric motor 52 and longitudinal rod movement and, in turn, a corresponding increase in length of the assemblage 50 to cause a pivotal traverse 48 in the brake pedal 46 which terminates rotation of the rear wheels 34 in contact with the riding surface 84.

The cycling of the braking systems 14, 32 of the vehicles 10, 36 uses, in a preferred embodiment, the extended length of the ram 56 to bring into contact the collar 62 fitted, as at 86, to the ram 56 against a switch 88, adjustably clamped to housing 54, and which switch 88 maintains pressure on pedal 16 until the towing vehicle driver releases pressure 18 on pedal 16, wherein relays 92 are electrically effective to reverse the polarity of motor 52 causing retracting movement of the rod 70 and a reverse direction pivotal traverse 48 of brake pedal to its non-braking position.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In combination, a braking system for a towing vehicle and for operating simultaneously therewith a braking system for a towed vehicle, both said braking systems of said towing and said towed vehicles comprising respectively a pivotally traversable mounted brake pedal adapted to be urged in movement from a non-braking position to a brake-applying position effective to cause braking of each said vehicle, said attained brake-applying position of said towing vehicle being operatively effective to generate an electrical current to illuminate rear brake lights of said towing vehicle, and said towed vehicle braking system comprising a positioned steering wheel above a positioned brake pedal so as to bound an established wedge dimension between said positions, an elongated length-adjustable brake-applying means consisting of telescoped first length-adjusting means and second length-adjusting means with set screw means adapted to be manually adjusted by relative sliding movement of said elongated length-adjusting brake-applying means to positions of movement maintained by said set screw means to a length equalling said wedge dimension, said elongated length-adjusting brake-applying means having an operative position in wedged relation between said steering wheel and said brake pedal, and an electric motor-operated lead screw and follower means attached to said set screw and said telescoped first and second length-adjusting means connected to be operated by said generated electric current incident to said braking of said towing vehicle, said operation of said lead screw and follower means causing an increase of said manually-adjusted length of said brake-applying means beyond said wedge dimension, whereby said length increase contributes to urging said towed vehicle brake pedal into said brake-applying position thereof and the same being synchronized to said generated electric current of said braking of said towing vehicle provides simultaneous operation of said braking systems of said towing and towed vehicles.

* * * * *